(12) United States Patent
Tokhtuev et al.

(10) Patent No.: US 8,387,777 B2
(45) Date of Patent: Mar. 5, 2013

(54) CONVEYOR CHAIN TENSION MONITOR

(75) Inventors: Eugene Tokhtuev, Duluth, MN (US);
Christopher Owen, Duluth, MN (US);
William M. Christensen, Hibbing, MN (US); Anatoly Skirda, Hermantown, MN (US); Viktor Slobodyan, Duluth, MN (US); Richard O. Ruhr, Buffalo, MN (US); Paul R. Kraus, Apple Valley, MN (US); Mark Lorenz, Duluth, MN (US)

(73) Assignee: Ecolab USA Inc., St Paul, MN (US)

( * ) Notice: Subject to any disclaimer, the term of this patent is extended or adjusted under 35 U.S.C. 154(b) by 390 days.

(21) Appl. No.: 12/574,417

(22) Filed: Oct. 6, 2009

(65) Prior Publication Data
US 2011/0079491 A1  Apr. 7, 2011

(51) Int. Cl.
*B65G 43/00* (2006.01)
(52) U.S. Cl. ................ 198/502.1; 198/810.04
(58) Field of Classification Search .............. None
See application file for complete search history.

(56) References Cited

U.S. PATENT DOCUMENTS

| | | | |
|---|---|---|---|
| 4,566,339 A | 1/1986 | Davidson et al. | |
| 4,977,783 A | 12/1990 | Pratt | |
| 5,207,108 A | 5/1993 | Tassic | |
| 5,272,924 A * | 12/1993 | Tassic et al. | 73/862.391 |
| 5,287,756 A | 2/1994 | Tassic | |
| 6,851,546 B2 | 2/2005 | Lodge | |
| 6,865,955 B2 | 3/2005 | Nassar et al. | |
| 6,938,732 B2 * | 9/2005 | Garbagnati | 184/15.1 |
| 7,082,845 B2 | 8/2006 | Simons | |
| 2004/0226805 A1 | 11/2004 | Lodge | |

FOREIGN PATENT DOCUMENTS

| | | |
|---|---|---|
| EP | 1362003 A2 | 11/2003 |
| WO | 02068310 A2 | 9/2002 |
| WO | 2007012796 A1 | 2/2007 |
| WO | 2009011595 A1 | 1/2009 |

OTHER PUBLICATIONS

Smartlink(TM) Improving Chain Performance With Technology, 2009, copyright Renold Power Transmission 2009, Ref: REN47 / ENG / 07.09.
Website: http://www.transducertechniques.com/TTL-Load-Cell.cfm, viewed Jul. 23, 2009.
International Search Report for PCT/IB2010/054505 mailed Jul. 21, 2011, 8 pages.

* cited by examiner

*Primary Examiner* — Kavel Singh
(74) *Attorney, Agent, or Firm* — Fredrikson & Byron, P.A.

(57) ABSTRACT

At least one single link of a conveyor chain is configured to support a tension load cell. A main body portion of the link includes a central cavity sized to contain the load cell, which has been inserted therein through an opening of the main body portion, and at least one auxiliary cavity to contain at least one battery cell and circuitry. A cap portion of the link closes off the opening into the cavity to enclose the load cell therein. One or both of the main body and cap portions may include a bore to receive a fastener for attaching to an end of the inserted load cell, and both portions include a bore oriented to receive a pin of a mating dual link of the conveyor chain. The cap portion may also include anti-rotation surfaces to mate with one or both of: the load cell and the opening.

20 Claims, 6 Drawing Sheets

CONVEYOR CHAIN TENSION MONITOR

TECHNICAL FIELD

The present disclosure pertains to monitoring tension in conveyor chains and more particularly to links thereof that support a tension load cell.

BACKGROUND

Many types of conveyors employ chains that are formed by pivotally connected alternating single and dual links. It is often desirable to monitor a tension along conveyor chains, for example, in order to detect wear and/or inadequate lubrication thereof. This monitoring may be accomplished by incorporating a tension load cell into one or more of the single links of the chain and gathering measurements from the load cell, either on a periodic or a continuous basis. Although conveyor systems that include chains having links configured to support such monitoring have been disclosed, there is still a need for new and improved links that are configured to support a tension load cell without comprising and/or interrupting the function of the conveyor chain in which the link is incorporated.

BRIEF DESCRIPTION OF THE DRAWINGS

The following drawings are illustrative of particular embodiments of the present disclosure and therefore do not limit the scope of the invention. The drawings are not to scale (unless so stated) and are intended for use in conjunction with the explanations in the following detailed description. Embodiments will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments. Examples of constructions, materials, dimensions, and manufacturing processes are provided for selected elements, and all other elements employ that which is known to those of skill in the field of the disclosure. Those skilled in the art will recognize that many of the examples provided have suitable alternatives that can be utilized.

Figure 1:
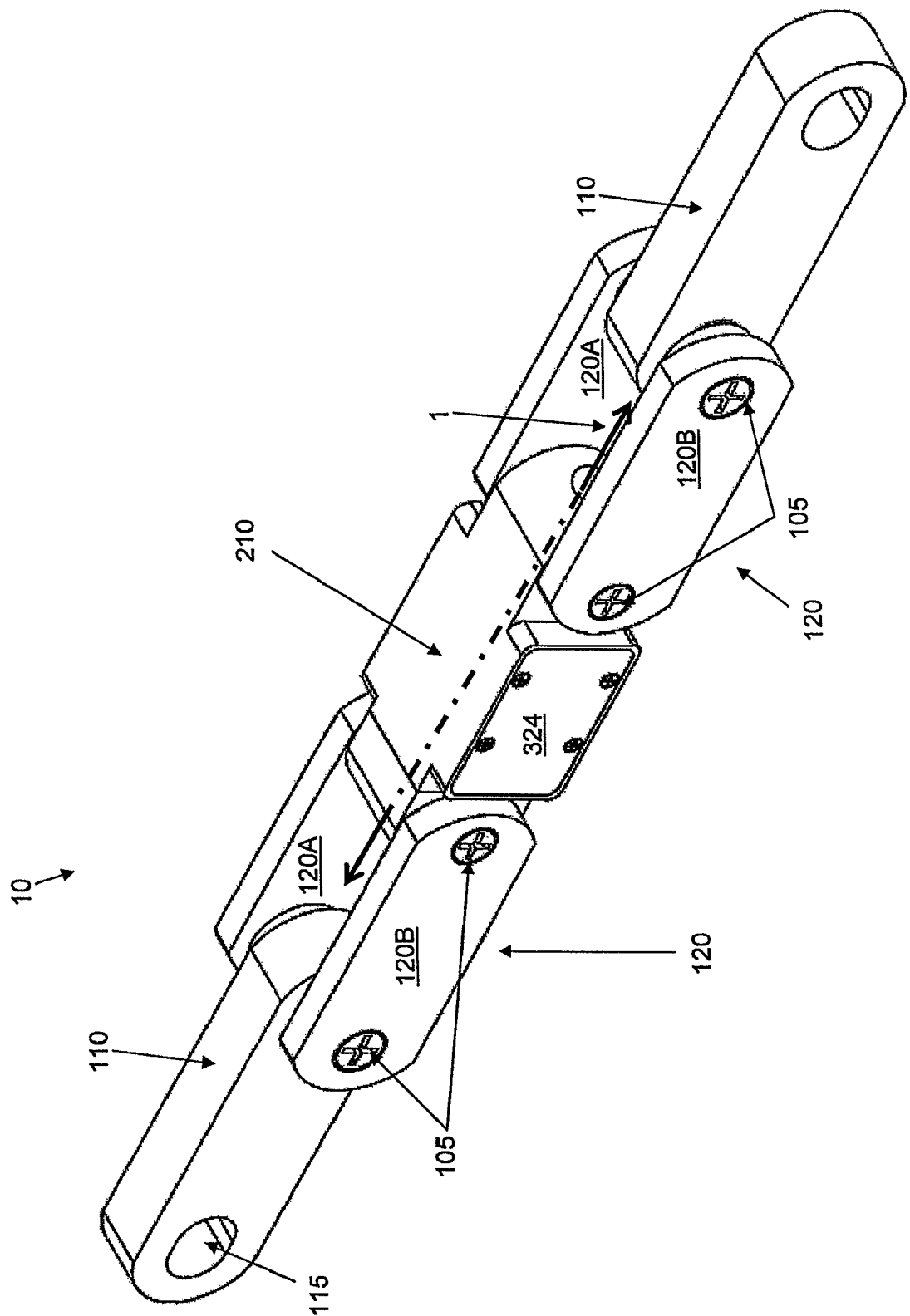
FIG. 1 is a perspective view of a portion of a conveyor chain that may incorporate embodiments of the present invention.

FIG. 1 is a perspective view of a portion of a conveyor chain 10 that may incorporate embodiments of the present invention. FIG. 1 illustrates chain 10 being formed by alternating single links 110/210 and dual links 120. FIG. 1 further illustrates each of dual links 120 including first and second opposing link members 120A, 120B, which are pivotally joined, at each end to the corresponding single link 110/210, via fasteners 105. According to the illustrated embodiment single link 210 differs from the other single links 110, in that link 210 is configured to support a tension load cell, for measuring tension along a longitudinal axis 1 of chain 10.

Figure 2:
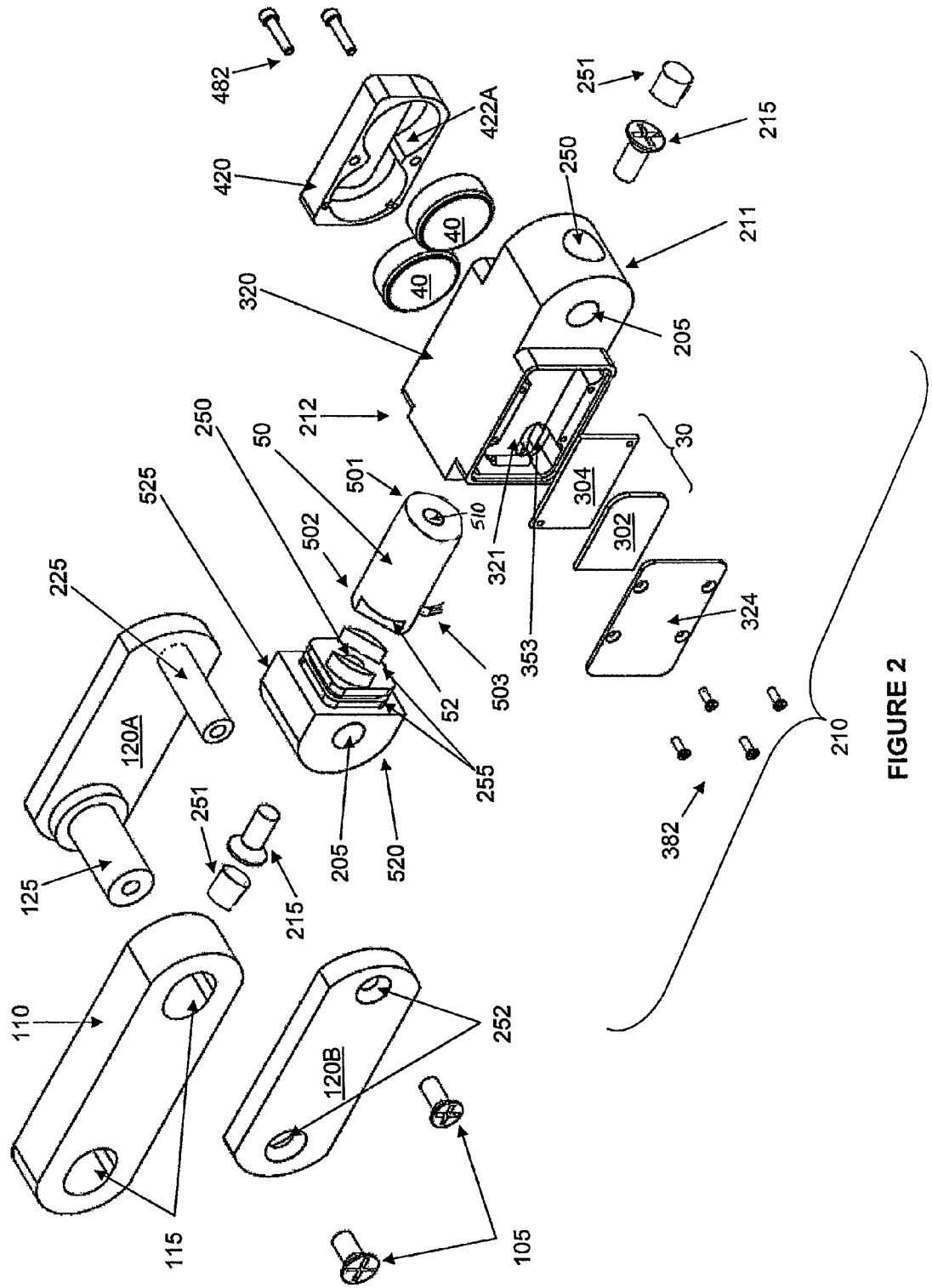
FIG. 2 is an exploded perspective view of some parts of the portion of the chain shown in FIG. 1, according to some embodiments of the present invention.

FIG. 2 is an exploded perspective view of one of single links 110, dual links 120 and of single link 210 of chain 10, according to some embodiments of the present invention. FIG. 2 illustrates single link 210 including a main body portion 320, which extends from a first end 211 to a second end 212, and a cap portion 520; cap portion includes a mating segment 525 through which a connecting bore 205 extends to receive a link pin 225 of the respective mating dual link 120, and, likewise, first end 211 of main body portion 320 includes a similarly oriented connecting bore 205 for receiving a link pin of another mating dual link (not shown). FIG. 2 further illustrates single link 110 including connecting bores 115 formed in opposing ends thereof, each of which is similarly oriented to receive a link pin of the corresponding dual link, for example, link pin 125. According to the illustrated embodiment, link pin 225 extends from first opposing link member 120A in order to pass through connecting bore 205 of link 210 and a corresponding bore 252 that is formed in a first end of second opposing link member 120B; likewise, link pin 125 extends from first opposing link member 120A in order to pass through connecting bore 115 of link 110 and a corresponding bore 252 that is formed in a second end of second opposing link member 120B; when assemble, each of link pins 225, 125 is secured by the corresponding fastener 105. Although FIG. 2 shows link pin 225 having a smaller diameter than link pin 125, this need not be the case for alternate embodiments.

With further reference to FIG. 2, a tension load cell 50 is shown positioned between cap portion 520 and main body portion 320 of link 210, adjacent to second end 212 of main body portion 320, for insertion into a central cavity 323 thereof. (Central cavity 323 may be seen in FIGS. 3A and 4.) Once inserted into central cavity 323, load cell 50 may be secured therein via attachment of one or both of fasteners 215 to respective first and second ends 501, 502 thereof. FIG. 2 illustrates a longitudinal bore 250 that extends, approximately orthogonal to connecting bore 205, from an outer surface of first end 211 of main body portion 320 to central cavity 323, in order to receive fastener 215, an end of which, once passed through bore 250 and into central cavity 323, may be attached to first end 501 of the inserted load cell 50, for example, via threaded engagement within a bore 510 located at first end 501 of load cell 50. Mating segment 525 of cap portion 520 includes a similar bore 250 that extends through an entirety of cap portion 520 in order to receive another similar fastener 215, shown in proximity thereto, for attachment to second end 502 of inserted load cell 50, for example, via a similar threaded engagement, once cap portion 520 closes off an opening 413 into central cavity 323. (Opening 413 into central cavity 323 may be seen in FIGS. 3A and 4.) It should be noted that, in alternate embodiments, central cavity 323 of main body portion 320 of single link 210 is configured to hold first end 501 load cell 50, when inserted therein, without the need for the fastener 215 that extends through the longitudinal bore 250 of first end 211 of main body portion 320, so that, according to these alternate embodiments, the longitudinal bore 250 of first end 211 need not be included.

FIG. 2 further illustrates main body portion 320 including a first auxiliary cavity 321, which is configured to contain circuitry 30 that facilitates operation and monitoring of load cell 50. Circuitry 30 is shown including a signal conditioning board 304, adapted for connection with load cell 50, via a plurality of load cell lead wires 503, and a wireless communications unit 302, adapted for connection to board 304, and programmable to send signals from load cell 50 to a remote monitoring station and/or a conveyor system controller according to a predetermined monitoring schedule and protocol. The monitoring of load cell 50 within a conveyor system will be further described below, in conjunction with FIG. 6. A passageway 353 is shown extending from central cavity 323 to first auxiliary cavity 321 for the feedthrough of lead wires 503 from load cell 50 to circuitry 30, when circuitry 30 is contained in first auxiliary cavity 321. Once plurality of lead wires 503 are electrically coupled to signal conditioning board 304, passageway 353 may be sealed with a silicone compound. According to the illustrated embodiment, first auxiliary cavity 321 is accessible from a first side of main body portion 320 via a first cover 324 that may be fastened, via fasteners 382, over an opening into first auxiliary cavity 321, when circuitry 30 is contained therein.

Figure 3A:
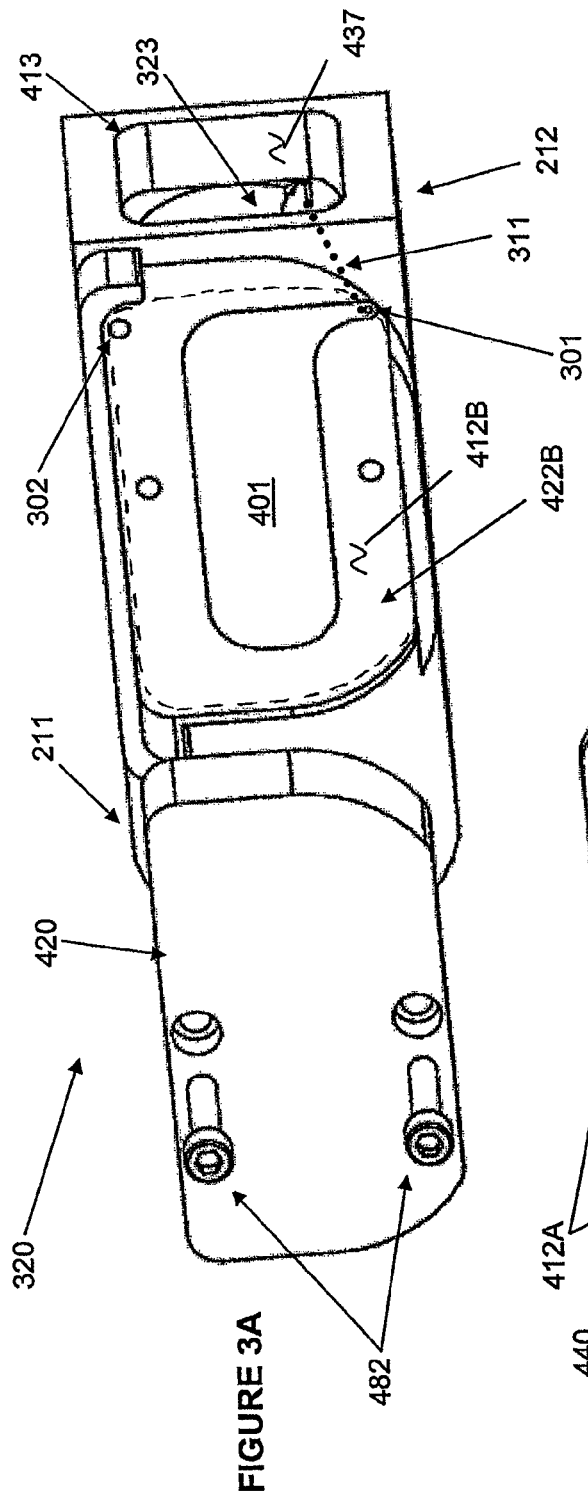
FIG. 3A is an exploded perspective view of a side of a main body portion of a single link, for example, of the chain show in FIGS. 1 and 2, according to some embodiments.

With further reference to FIG. 2, main body portion 320 of link 210 further includes a second cover 420, in which a first part 422A of a second auxiliary cavity is formed 210; first part 422A of the second auxiliary cavity is shown having an inner perimeter contour to match a pair of battery cells 40, for enclosure thereof within the second auxiliary cavity. FIG. 3A is an exploded perspective view of main body portion 320, from a second side thereof, by which view a second part 422B of the second auxiliary cavity can be seen. FIG. 3A illustrates second part 422B having an inner perimeter contour to match an outer perimeter contour of cover 420. Thus, according to the illustrated embodiment, battery cells 40 (FIG. 2) fit within the inner perimeter contour of first part 422A of the second auxiliary cavity, and the outer perimeter contour of cover 420 fits within the inner perimeter contour of second part 422B of the second auxiliary cavity, when batteries 40 are contained and electrically coupled within the second auxiliary cavity of main body portion 320 of link 210. According to some alternate embodiments, the sidewalls that define the inner perimeter contour of second part 422B may be more extensive, for example, to surround all of the perimeter of cover 420 in order to provide more mechanical protection for cover 420, which may be formed from a plastic.

FIG. 3A further illustrates a first battery contact 401, which is formed on a surface 412B of the second auxiliary cavity, for example, being bonded to an insulated pad of surface 412B. The insulated pad of surface 412B may be made of a relatively soft silicone rubber, which can function as a sealing member, when cover 420 is secured, for example, via fasteners 482, within second part 422B of the second auxiliary cavity. A terminal end 301 of first battery contact 401 is shown being electrically coupled, for example, via soldering, to a lead wire 311 (shown with a dotted line) that extends through main body portion 320 of link 210, from the second side to the first side, for electrical coupling, for example, via soldering, to signal conditioning board 304 of circuitry 30 (FIG. 2), when circuitry 30 is contained within first auxiliary cavity 321.

Figure 3B:
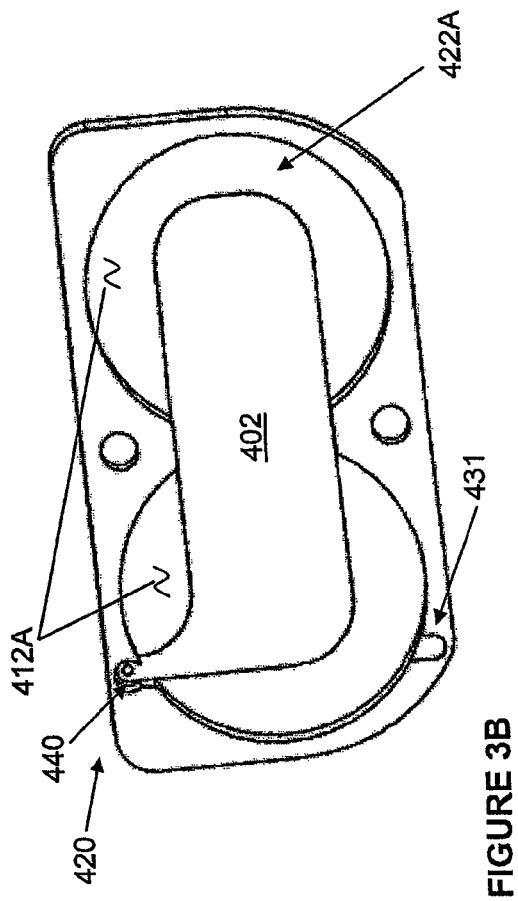
FIG. 3B is a perspective view of a cover from the side of the main body portion, according to some embodiments.
Figure 4:
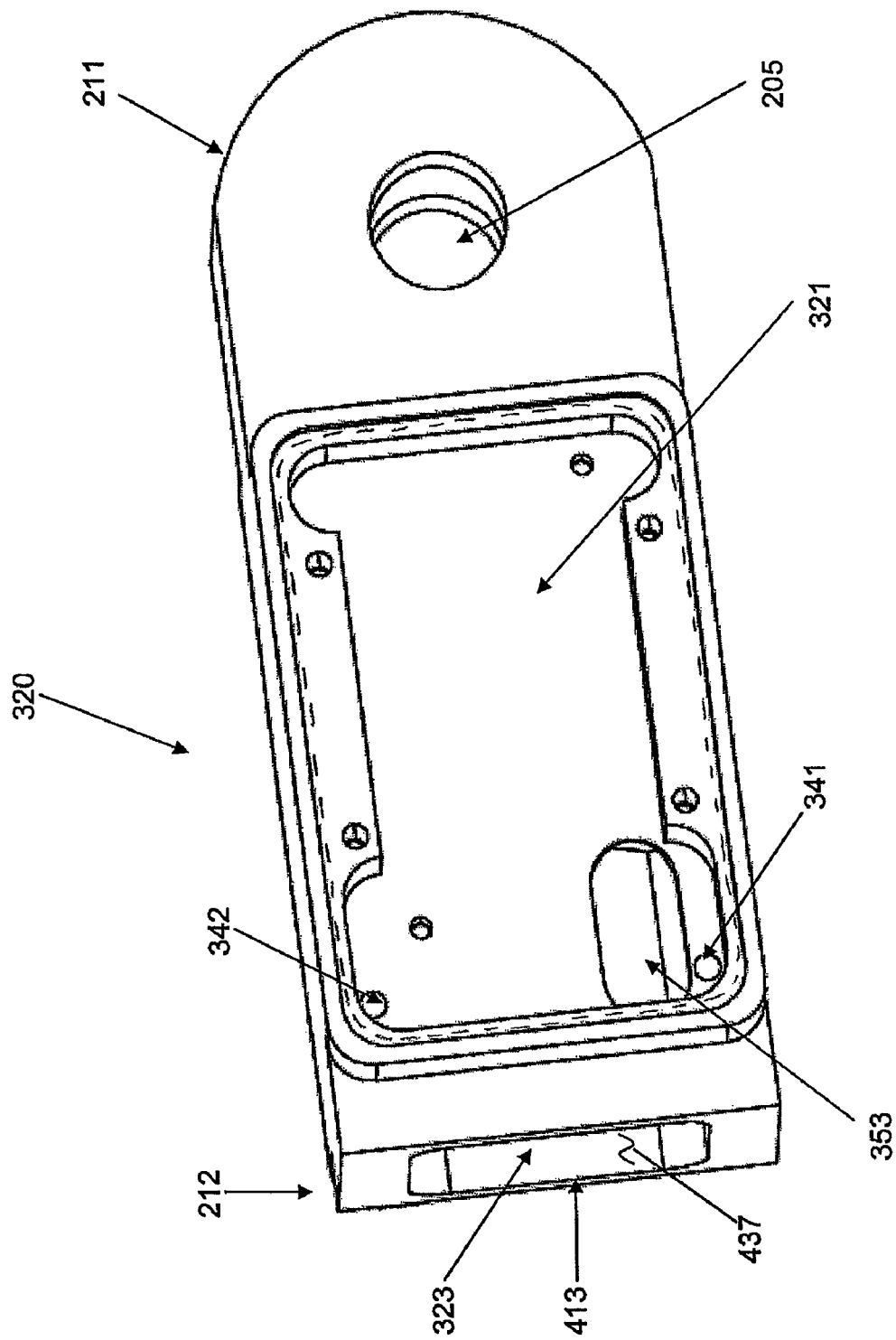
FIG. 4 is a perspective view of another side of the main body portion of the single link, according to some embodiments.

With reference to FIG. 4, which is a perspective view of main body portion 320, from the first side thereof, a channel 342 extends from first auxiliary cavity 321 to surface 412B of the second auxiliary cavity; and with further reference to FIG. 3A, a first contact pin 302 is shown mounted in channel 342. According to the illustrated embodiment, the end of first contact pin 302, which is shown in FIG. 3A, is positioned for electrical contact with a second contact pin 440, which is shown in FIG. 3B. According to FIG. 3B, pin 440 is electrically coupled to a second battery contact 402 formed on an interior surface 412A of cover 420, when cover 420 is attached, for example, via fasteners 482, to surface 412B of main body portion 320 for the enclosure of battery cells 40 within the second auxiliary cavity. Another end of first contact pin 302, which is opposite that shown in FIG. 3A, may be coupled to a lead wire that extends through channel 342 to first auxiliary cavity 321, for electrical coupling, for example, via soldering, to signal conditioning board 304 of circuitry 30 (FIG. 2), when circuitry 30 is contained within first auxiliary cavity 321; or, first contact pin 302 may extend through channel 342 to first auxiliary cavity 321 for direct coupling to signal conditioning board 304. According to some preferred embodiments, first contact pin 302 is spring loaded and coupled to the lead wire that extends through channel 342 to first auxiliary cavity 321.

FIG. 4 further illustrates another channel 341 through which lead wire 311 (FIG. 3A) may extend, for example, from a solder junction with terminal end 301 of battery contact 401 to the aforementioned coupling with signal conditioning board 304. FIG. 3B further illustrates a notch 431 formed in cover 420 in order to provide clearance for the solder junction between lead wire 311 and terminal end 301 of first battery contact 401, according to some embodiments.

With reference back to FIG. 2, cap portion 520 of link 210 is shown including anti-rotation surfaces 255, one set of which mates with opening 413 into central cavity 323 of main body portion 320 (FIGS. 3A and 4), and another set of which mates with load cell 50. One or both of sets of anti-rotation surfaces 255 may be useful to prevent torsional forces from loosening the attachment of one or both of fasteners 215 to load cell 50, when link 210 is assembled into chain 10 and chain 10 is operating in a conveyor system. It should be noted that, although one or both of sets of anti-rotation surfaces 255 is preferred, only one or neither is included in alternate embodiments that rely more upon the connection of dual links 120, to either end of single link 210 (FIG. 1), to prevent any significant loosening.

Figure 5:
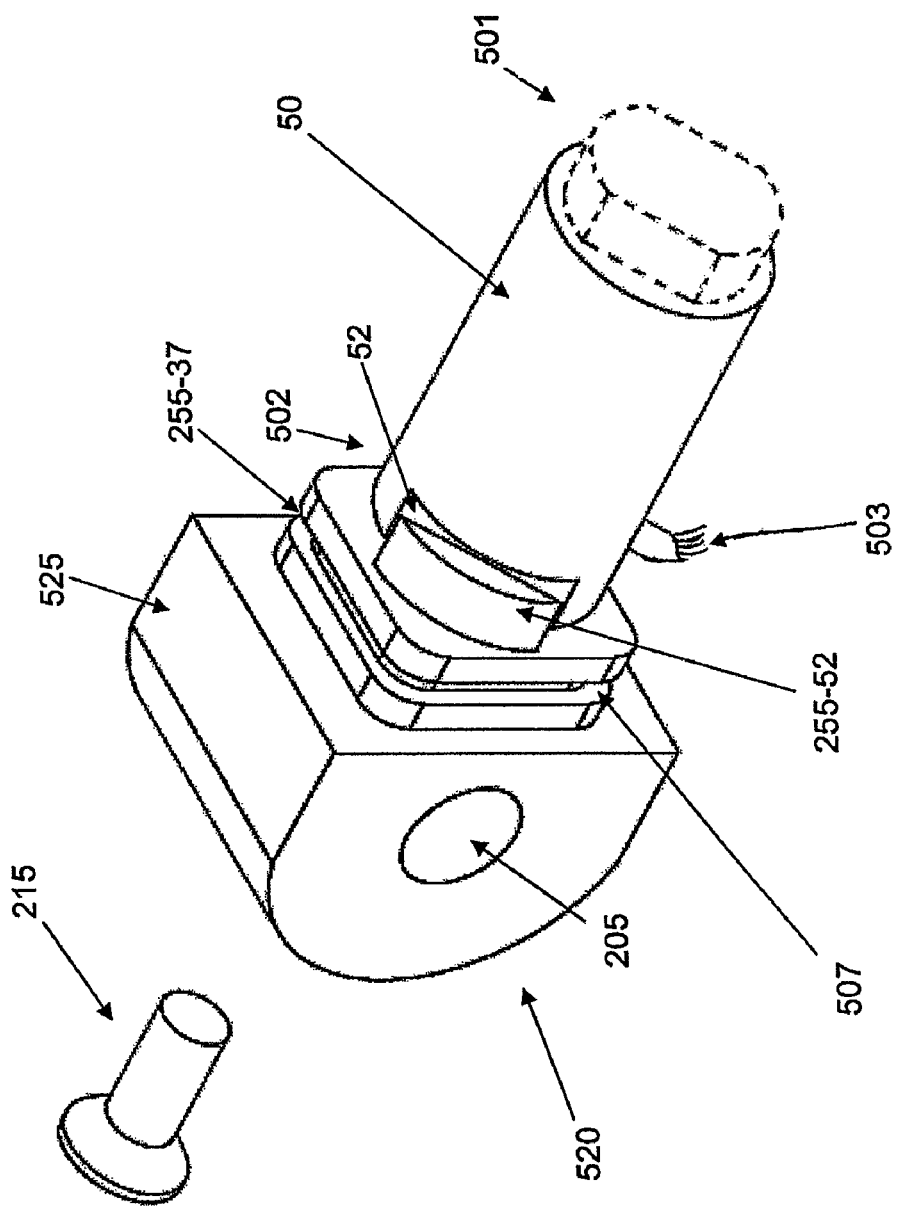
FIG. 5 is a perspective view of a cap portion of a single link, for example, of the chain shown in FIGS. 1 and 2, in conjunction with a tension load cell, according to some embodiments of the present invention.

FIG. 5 is a perspective view of cap portion 520 of link 210 in conjunction with tension load cell 50. FIG. 5 illustrates a set of anti-rotation surfaces 255-37 formed by flat portions of an outer perimeter of cap portion 520. According to the illustrated embodiment, when cap portion 520 closes off opening 413 into central cavity 323, the flat portions of the outer perimeter are configured to mate with corresponding flat portions of an inner surface 437 that surrounds opening 413 into central cavity 323 of main body portion 320. (Inner surface 437 may be seen in FIGS. 3A and 4.)

FIG. 5 further illustrates another set of anti-rotation surfaces 255-52 formed by inward facing and opposing flats, which are spaced apart to receive second end 502 of load cell 50 and to engage with flats 52 formed in second end 502. According to the illustrated embodiment, once load cell 50 held within central cavity 323 of main body portion 320, for example, via the fastener 215 that extends through longitudinal bore 250 formed in first end 211 of main body portion 320, cap portion 520 may be moved into engagement with opening 413 into central cavity 323 such that set of anti-rotation surfaces 255-52 are oriented to engage with flats 52 of load cell 50, as shown in FIGS. 2 and 5, prior to inserting fastener 215 into longitudinal bore 250 of cap portion 520 and attaching fastener 215 to second end 502 of load cell 50. Alternately, second end 502 of load cell 50 may be attached, via one of fasteners 215, to cap portion 520, before cap portion 520 is moved into engagement with opening 413 of central cavity 323, in which case, load cell 50 is inserted into central cavity 323 as cap portion 520 is moved into engagement. Dashed lines in FIG. 5 illustrate an additional or alternate location of flats 52 at first end 501 of load cell 50, for example, to mate with inward facing and spaced apart opposing flats that may be formed within central cavity 323 of main body portion 320 of link 210, in proximity to second end 211 thereof, according to some alternate embodiments. It should be noted that alternative forms of anti-rotation surfaces, for example, being formed by interlocking features of cap portion 520 and load cell 50 and/or main body portion 320, may be included in further alternate embodiments of the present invention.

With further reference to FIG. 5, a groove 507 is shown formed in the perimeter of cap portion 520, which groove 507 is configured to receive either a pre-formed sealing member, or application of a sealing compound, for sealing engagement with inner surface 437 that surrounds opening 413 into central cavity 323 of main body portion 320 (FIGS. 3A and 4). According to some alternate embodiments, the perimeter of cap portion 520 is cylindrical and, thus, does not include anti-rotation surfaces 255-37, so that groove 507 is more suitably configured to receive a sealing member like an O-ring. Sealing load cell 50 within central cavity 323 may be desirable, for example, when chain 10 is employed in a conveyor system that operates in a relatively dusty and/or wet environment, in order to protect load cell 50 from the external environment. With reference back to FIG. 2, additional sealing of load cell 50 within central cavity 323 may be provided by sealing plugs 251, which are shown in proximity to fasteners 215 for insertion into, and sealing engagement with, longitudinal bores 250, following the attachment of fasteners 215 to ends of load cell 50. As for load cell 50, sealing of circuitry 30 and battery cells 40 within respective first and second auxiliary cavities may be desirable. Although not shown, sealing members for the auxiliary cavities may be applied about the perimeters of the auxiliary cavities, for example, as indicated with the dashed lines in FIGS. 3A and 4.

According to one exemplary embodiment of the present invention: load cell 50 is a TLL series load cell that has a 500 pound capacity and is available from Transducer Techniques®; cap portion 520 and main body portion 320 are machined from stainless steel; cover 320 for first auxiliary compartment 321 is formed from a hard plastic, such as FR-4, which is a composite of a resin epoxy reinforces with a woven fiberglass material, and is sealed in place with a silicone compound (as well as being fastened with fasteners 382 shown in FIGS. 1 and 2); cover 420 is formed from an abrasion-resistant plastic such as Ultra-high molecular weight polyethylene (UHMWPE); each of battery cells 40 is a 3 volt lithium battery (CR 2477); and pre-formed sealing members, for example, for placement in groove 507 of cap portion 520 and sealing plugs 251 are formed from silicone rubber.

Figure 6:
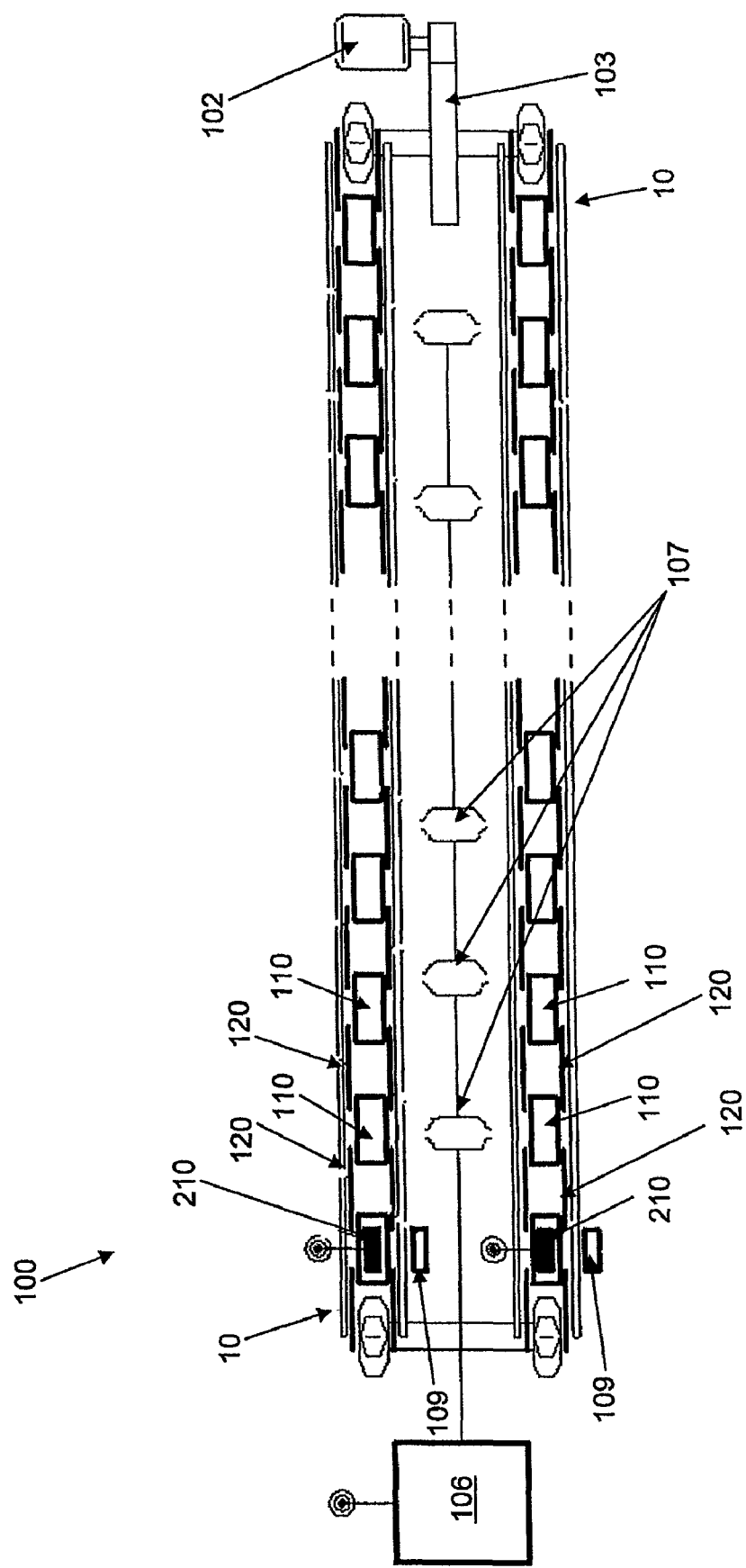
FIG. 6 is a plan view of a conveyor system in which the conveyor chain of FIGS. 1 and 2 may be employed, according to some embodiments.

FIG. 6 is a plan view of a conveyor system 100 in which conveyor chain 10 may be employed. FIG. 6 illustrates conveyor system 100 including a pair of conveyor chains 10, guided in respective channels that are spaced apart from one another so that chains 10 may support loads, for example, crates of product, that are conveyed atop chains 10; system 100 further includes an electric motor 102 and a gear unit 103, through which motor 102 works to move chains 10, via mating sprockets (not shown). FIG. 6 further illustrates system 100 including a conveyor controller 106, which is adapted to receive wireless transmission of tension load measurements made by the tension load cell 50 that is supported by each of the links 210, for example, according to the embodiments that are described above in conjunction with FIGS. 1-5.

As previously described, load cell 50, when held in central cavity 323 of link 210, is electrically coupled to circuitry 30 and, preferably, attached at either end 501, 502, via fasteners 215, in order to measure tension forces applied along longitudinal axis 1 of chain 10 (FIG. 1). Circuitry 30, which is contained in link 210, for example, according to previously described embodiments, is adapted to process measurement signals from load cell 50 and to transmit the signals, wirelessly to conveyor controller 106. Conveyor controller 106 may be programmed to generate and analyze tension profiles with the signals from links 210, in order to monitor distributions of friction forces along chains 10. According to the illustrated embodiment, controller 106 is coupled to each of a plurality of lubricating units 107, which are spaced apart along a length of the conveyor chains 10, so that, when the monitoring detects friction forces above a predetermined threshold, controller 106 sends control signals that cause one or more of lubricating units 107 to apply a lubricant to one or both of chains 10.

According to some preferred embodiments, controller 106 is programmed to periodically collect measurements from links 210 according to a predetermined schedule and at predetermined locations along the channels. With further reference to FIG. 6, system 100 is shown including a permanent magnet 109 mounted alongside each of chains 10 to function in conjunction with a proximity sensor included in the corresponding link 210, which may facilitate the periodic collection of measurements. According to some preferred embodiments, when each link 210 comes into proximity with the corresponding magnet 109, controller 106 receives input from the proximity sensor to send a signal to switch on power in link 210 for a predetermined number of runs of chain 10 past magnet 109; controller 106 then sends a signal to switch off the power, until a subsequent predetermined number of runs of chain 10 past magnet 109 are detected. Magnets 109 and the corresponding proximity sensors may further function to synchronize consecutive runs of chains 10, when load measurements are to be averaged over several runs. The proximity sensor of each link 210 may be contained in the first auxiliary cavity of link 210 along with circuitry 30.

In the foregoing detailed description, specific embodiments have been described. However, it may be appreciated that various modifications and changes can be made without departing from the scope of the invention as set forth in the appended claims.

The invention claimed is:

1. A single link of a conveyor chain, the link configured to support a tension load cell, the link comprising:
a main body portion including a central cavity, a first end, a second end, a connecting bore extending through the first end, and at least one auxiliary cavity; the central cavity being configured to hold the load cell, the load cell for measuring a tension applied to the load cell, the second end including an opening into the central cavity, through which the load cell can be inserted, the connecting bore being oriented to receive a link pin of a mating dual link of the conveyor chain, and the at least one auxiliary cavity being sized to contain circuitry and at least one battery cell; and
a cap portion for closing off the opening into the central cavity of the main body portion and, thereby, enclose the inserted load cell within the link, the cap portion including a mating segment, anti-rotation surfaces, a longitudinal bore extending through an entirety of the cap portion, and a connecting bore extending through the mating segment of the cap portion, approximately orthogonal to the longitudinal bore of the cap portion, and being oriented to receive a link pin of another mating dual link of the conveyor chain, the longitudinal bore of the cap portion being adapted to receive a fastener for attaching to an end of the inserted load cell within the central cavity of the main body portion, when the cap closes off the opening into the central cavity;

wherein the anti-rotation surfaces mate with one or both of: the inserted load cell and the opening into the central cavity of the main body portion, when the cap closes off the opening into the central cavity.

2. The link of claim 1, wherein the anti-rotation surfaces of the cap portion comprise opposing flats that extend into the central cavity, when the cap portion closes off the opening into the central cavity, and are spaced apart to receive the end of the inserted load cell therebetween.

3. The link of claim 1, wherein:
an inner surface of the main body portion that surrounds the opening into the central cavity includes flat portions; and
the anti-rotation surfaces of the cap portion comprise flat portions of an outer perimeter of the cap portion, the outer perimeter being located so that the flat portions thereof mate with the flat portions of the inner surface of the main body portion when the cap portion closes off the opening in the central cavity of the main body portion.

4. The link of claim 3, wherein the outer perimeter of the cap portion include grooves to receive a seal member for sealing engagement with the inner surface of the main body portion, when the cap portion closes off the opening in the central cavity of the main body portion.

5. The link of claim 1, wherein:
the at least one auxiliary cavity of the main body portion comprises a first auxiliary cavity and a second auxiliary cavity;
the first auxiliary cavity is sized to contain signal conditioning and wireless communications circuitry and is accessible from a first side of the main body portion, the first side of the main body portion extending longitudinally between the first and second ends of the main body portion; and
the second auxiliary cavity is sized to contain a battery cell, includes a battery contact formed therein for connection to the battery cell, when the battery cell is contained therein, and is accessible from a second side of the main body portion, the second side also extending longitudinally between the first and second ends of the main body portion and being opposite the first side of the main body portion.

6. The link of claim 5, wherein the main body portion further includes a lead wire extending therethrough, between the first auxiliary cavity and the second auxiliary cavity, the lead wire being electrically coupled to the battery contact of the second auxiliary cavity and being adapted for electrical coupling to the circuitry, when the circuitry is contained in the first auxiliary cavity.

7. The link of claim 5, further comprising a cover removably attached to the main body portion for enclosure of the battery cell within the second auxiliary cavity, the cover including an interior surface that forms a part of the second auxiliary cavity and on which the battery contact is formed.

8. The link of claim 7, wherein the main body portion further includes a channel extending between the first and second auxiliary cavities, a first contact pin mounted within the channel and being adapted for electrical coupling to the circuitry, when the circuitry is contained in the first auxiliary cavity, and a second contact pin electrically coupled to the battery contact and being located for electrical contact with the first contact pin, when the cover is attached to the main body portion for enclosure of the battery cell within the second auxiliary cavity.

9. The link of claim 8, wherein the first contact pin is spring-loaded.

10. The link of claim 5, wherein the main body portion further includes a passageway extending between the central cavity and the first auxiliary cavity and being located in proximity to the opening into the central cavity, the passageway being sized to route a plurality of lead wires from the inserted load cell to the first auxiliary cavity for electrical coupling with the circuitry, when the circuitry is contained in the first auxiliary cavity.

11. The link of claim 1, further comprising a sealing plug being configured for sealing engagement within the longitudinal bore of the cap portion, once the fastener has been received therein.

12. The link of claim 1, wherein the main body portion further includes a longitudinal bore extending from an outer surface of the first end to the central cavity, approximately orthogonal to the connecting bore of the main body portion, the longitudinal bore of the main body portion being adapted to receive a fastener for attaching to another end of the inserted load cell, within the central cavity.

13. The link of claim 12, further comprising a pair of sealing plugs, wherein each of the sealing plugs is configured for sealing engagement within a corresponding longitudinal bore, once the respective fastener has been received therein.

14. The link of claim 1, wherein the cap portion further includes a sealing surface configured for sealing engagement with an inner surface of the main body portion that surrounds the opening into the central cavity.

15. A single link of a conveyor chain, the link configured to support a tension load cell, the link comprising:
a main body portion including a central cavity, at least one auxiliary cavity, a first end, a second end, a longitudinal bore extending from an outer surface of the first end to the central cavity, and a connecting bore extending through the first end, approximately orthogonal to the longitudinal bore, the central cavity being sized to contain the load cell, the load cell for measuring a tension applied to the load cell, the second end including an opening to the central cavity through which the load cell can be inserted, the longitudinal bore adapted to receive a fastener for attaching to an end of the inserted load cell within the central cavity, the connecting bore adapted to receive a link pin of a mating dual link of the conveyor chain, and the at least one auxiliary cavity being sized to contain circuitry and at least one battery cell; and
a cap portion for closing off the opening in the central cavity of the main body portion and thereby enclose the inserted load cell within the link, the cap portion including a mating segment, a longitudinal bore extending through an entirety of the cap portion, and a connecting bore extending through the mating link segment of the cap portion, approximately orthogonal to the longitudinal bore of the cap portion, and being adapted to receive a link pin of another mating dual link of the conveyor chain, the longitudinal bore of the cap portion being adapted to receive another fastener for attaching to another end of the inserted load cell within the central cavity.

16. The link of claim 15, wherein the cap portion further includes opposing flats that extend into the central cavity, when the cap portion closes off the opening into the central cavity, the opposing flats being spaced apart to receive the end of the inserted load cell therebetween.

17. The link of claim 15, wherein:

an inner surface of the main body portion that surrounds the opening into the central cavity includes flat portions; and the cap portion further includes an outer perimeter having flat portions, the outer perimeter being located so that the flat portions thereof mate with the flat portions of the inner surface of the main body portion, when the cap portion closes off the opening in the central cavity of the main body portion.

18. The link of claim 17, wherein the cap portion further includes a groove formed in the outer perimeter thereof, the groove being sized to receive a seal member for sealing engagement with the inner surface of the main body portion, when the cap portion closes off the opening in the central cavity of the main body portion.

19. The link of claim 15, the cap portion further includes a sealing surface configured for sealing engagement with an inner surface of the main body portion that surrounds the opening into the central cavity.

20. The link of claim 15, further comprising a pair of sealing plugs, wherein each of the sealing plugs is configured for sealing engagement within a corresponding longitudinal bore, once the respective fastener has been received therein.

* * * * *